United States Patent [19]
Brown et al.

[11] Patent Number: 5,974,978
[45] Date of Patent: *Nov. 2, 1999

[54] STABILIZED LIGHTWEIGHT EQUIPMENT TRANSPORT SYSTEM

[76] Inventors: Gerrett W. Brown, 515 Addison Ct, Philadelphia, Pa. 19147; David Keller, 353 Cambridge La., Newtown, Pa. 18940

[*] Notice: This patent is subject to a terminal disclaimer.

[21] Appl. No.: 09/078,744

[22] Filed: May 14, 1998

Related U.S. Application Data

[62] Division of application No. 08/788,645, Jun. 19, 1996, Pat. No. 5,784,966.

[51] Int. Cl.⁶ ..................................................... G03B 17/00
[52] U.S. Cl. ........................... 104/304; 104/118; 105/141; 352/243
[58] Field of Search ................................ 104/126, 53, 55, 104/56, 74, 81, 76, 118, 304; 105/141; 352/243; 396/12, 13, 329, 419, 428

[56] References Cited

U.S. PATENT DOCUMENTS

| | | | |
|---|---|---|---|
| 2,499,470 | 3/1950 | Duncan | 104/76 |
| 2,567,068 | 9/1951 | Halmer | 396/419 |
| 2,630,076 | 3/1953 | Stieve . | |
| 3,399,614 | 9/1968 | Fischer | 396/419 |
| 3,902,432 | 9/1975 | Shortridge et al. . | |
| 4,233,634 | 11/1980 | Adams | 352/243 |
| 4,334,480 | 6/1982 | Wallace . | |
| 4,498,744 | 2/1985 | Ealovega et al. | 352/243 |
| 4,699,484 | 10/1987 | Howell et al. . | |
| 4,763,151 | 8/1988 | Klinger . | |
| 4,821,106 | 4/1989 | Fujita et al. . | |
| 4,952,953 | 8/1990 | Ridderstolpe et al. | 352/243 |
| 5,113,768 | 5/1992 | Brown . | |
| 5,197,700 | 3/1993 | Chapman | 352/243 |
| 5,222,439 | 6/1993 | Di Rosa . | |
| 5,224,426 | 7/1993 | Rodnunsky et al. . | |
| 5,463,432 | 10/1995 | Kahn . | |
| 5,784,966 | 7/1998 | Brown et al. | 104/304 |

Primary Examiner—Mark T. Le
Attorney, Agent, or Firm—Weiser and Associates P.C.

[57] ABSTRACT

A lightweight, remote-controlled, self-propelled equipment support and transport system is stabilized against unwanted angular deviation in each of three perpendicular axes and adapted for motion at high speed along a simple tubular monorail. The system can be quickly and efficiently ground-mounted on stands, suspended horizontally from brackets or from a variety of overhead supports, or vertically mounted alongside a mast or wall. The system includes an elongated drive car running on and partly surrounding a rail, and an equipment support associated with the drive car and configured so that the supported equipment is transversely and longitudinally spaced and balanced about a point just below the center of the rail. The equipment support is mounted in angular isolation relative to the drive car by a system of damped pivots about pitch and yaw axes. The drive car includes a steering adjustment adapted to counteract slight variations in wheel alignment that might tend to drive the transport off-level when in motion along the rail.

14 Claims, 12 Drawing Sheets

STABILIZED LIGHTWEIGHT EQUIPMENT TRANSPORT SYSTEM

This application is a divisional of U.S. patent application Ser. No. 08/788,645, filed Jun. 19, 1996, now U.S. Pat. No. 5,784,966.

BACKGROUND OF THE INVENTION

The present invention generally relates to the field of stabilized, equipment transporting devices, and more particularly, to a simple and efficient apparatus for the high-speed transport of lightweight cameras or other equipment which may be orientation-sensitive and/or stability-sensitive so that the equipment is isolated from unwanted motions. Although the following discussion will proceed in the context of motion picture (primarily video) applications for purposes of convenience in description, it is to be understood that the improvements which are described will find utility in connection with any of a variety of possible applications.

Since the beginning of motion picture photography, when it became desirable to transport cameras in a stable manner, so-called "camera dollies" have been used to ameliorate the adverse effects of motion in the camera. Such dollies tend to be simple wheeled vehicles, without any suspension or other means for isolating the camera from unwanted movements of the dolly. What is more, such dollies are quite cumbersome in use since unless the terrain consists of near perfect planar flooring, the dolly must ride on a system of rails for leveling irregularities in the supporting surface. Such rail systems must in turn be laboriously leveled to achieve their intended result.

Such shortcomings have led to the invention of the "Steadicam®" and "Skycam®" camera transporting systems. The "Steadicam®" camera transporting system is described in U.S. Pat. Nos. RE 32,213; 4,156,512; 4,208,028; 4,394,075; and 4,474,439, and has become an industry standard for stabilizing ambulatory, hand-held cameras. The "Skycam®" camera transporting system is described in U.S. Pat. Nos. 4,533,955; 4,625,938; and 4,710,819, and provides a stabilized aerial camera transport to, in essence, "fly" a suspended camera over an area such as an arena or auditorium. Both of these devices avoid the need for rails, and operate conveniently and smoothly over rough terrain.

However, the underlying difficulties with rail systems remained unsolved and such problems have become aggravated as the required speed of transport (for camera systems) has increased responsive to the demands of the industry.

Known dolly and rail systems generally employ two rails for the dolly. So-called "monorail" systems have also been developed, employing a single rail structure having at least two surfaces (e.g., an I-beam) for receiving the dolly's wheels. In each case, the dolly is suitably referenced to the upright, level position which is needed for the equipment it supports. The difficulty is that the two rails, or the two surfaces of a monorail, must not only be laid straight and true along the path of the dolly's progress, but also must be carefully leveled in reference to one another. Otherwise, the dolly will tend to lurch (transverse lateral and rolling movements) down the rails (or rail) of the system. Even with the best of care, such leveling operations can only be as accurate as the equipment (e.g., the bubble level or digital level sensing device) employed. As the speed of the dolly's progress increases, virtually any irregularities can cause increasing vibration in the camera sequences obtained (i.e., the "shot").

As the need for stable, high-speed traveling shots increased over the years, a variety of isolated, mass/gyro-stabilized camera systems (housings) were developed which could be transported by other, essentially unstable vehicles (including helicopters and camera cars) at practical speeds. In an effort to provide a stabilized camera transport system smaller than a camera car, and adapted for sports coverage, a device (a vehicle known as "RailCam™") was developed to transport such stabilized gyro-cameras using an electrically powered, unstabilized dolly running on a rail system. Although this device has been used to make exciting traveling shots of runners and ice-skaters, it is expensive, labor intensive, large and power demanding. As a result, the device can only meet the needs of large, well-funded sporting events.

At the same time, video cameras have continued to reduce in size, and the need for a small, stable, ultra-light, self-propelled camera transport system has become more acute. The above-described "RailCam™" device has been unable to meet limited budgeting requirements, yet the need to enhance viewer excitement by obtaining moving camera shots in an increasingly diverse spectrum of events, including sports, music and entertainment television, has continued to increase. In an effort to satisfy these ever-increasing needs, so-called "point-of-view" cameras have proliferated in an effort to place viewers in the midst of the action. Particularly for sporting events, such miniature cameras have been inconspicuously placed on race-cars, and on the helmets of football players, but the stability of the shots obtained using such equipment is limited to the inherent stability of the carrier (i.e., the race-car or football player).

Despite all efforts directed at this problem, there remains no comparable, ultra-small tracking camera system of a size and weight appropriate for use with the miniature high-quality video cameras which are currently available. It therefore remained to develop such a system, capable of delivering a slim, ultra-light, railed "footprint", and capable of rapid, versatile and silent deployment close to the action to be shot, yet which is stabilized to a sufficient degree to provide "broadcast-quality" images during such high-speed tracking applications.

SUMMARY OF THE INVENTION

It is therefore the primary object of the present invention to provide a lightweight, track mounted equipment transporting system that is isolated from the minute vibrations inherent in existing rail system and stabilized without resort to heavy mass/gyro-systems.

It is also an object of the present invention to provide a stabilized, lightweight, remote-controlled equipment transporting system for use with miniaturized and ultra-light cameras.

It is also an object of the present invention to provide a stabilized, self-propelled equipment transporting system that eliminates the need to level plural rails or spaced surfaces relative to one another, primarily about the axis of travel of the system.

It is also an object of the present invention to provide a self-propelled equipment transporting system with stability that is augmented by use of a simplified rail system, and which is capable of rapid, efficient and precise deployment and "wrap" (i.e., striking and repacking following use).

It is also an object of the present invention to provide a stabilized, self-propelled equipment transporting system that can readily be configured for deployment in a horizontal, vertical or hanging configuration.

It is also an object of the present invention to provide a stabilized, self-propelled equipment transporting system that can provide accurate vernier compensation for slight misalignments of its interface with the corresponding rail system, without otherwise affecting level progress of the transporting system along the rail system.

It is also an object of the present invention to provide a stabilized, self-propelled equipment transporting system that includes a novel drive mechanism which permits the mass of the drive motors to be mounted along the center line of the transporting system.

It is also an object of the present invention to provide a stabilized, self-propelled equipment transporting system which is well suited to supporting a miniaturized or lightweight camera for use in providing stabilized "broadcast-quality" images during transport of the camera along the deployed rail system.

These and other objects which will become apparent are achieved in accordance with the present invention by providing an equipment transporting system having a laterally expanded, balanced equipment support straddling an elongated drive car by means of an isolated, damped and multi-pivoted bridge. The resulting combination is adapted to be self-propelled, in equipoised balance, along a single tubular rail system. The car is self-propelled, and with the equipment support, is lightweight in construction and stabilized against angular deviation in each of three operative axes (hereafter referred to as "yaw", "pitch" and "roll") relative to the primary axis of travel. The drive car is adapted for motion at relatively high speeds along a simple, tubular monorail structure which can be quickly and efficiently deployed (e.g., ground-mounted on stands, vertically mounted on masts or walls, or horizontally suspended from overhead supports).

To such ends, the equipment transporting system employs a drive car and an associated equipment support which are configured and which cooperate so that the equipment components to be transported by the system are transversely and longitudinally spaced, to increase rotational inertia, and are balanced about a point just below the center of the rail of the supporting system. The equipment support is mounted in angular isolation relative to the drive car, about pitch and yaw axes, by a system of damped pivots. A single steering adjustment is adapted to counteract slight variations in alignment of the rolling elements of the drive car that could tend to drive the car "off-level" when in motion along the rail (and to the opposite side when in reverse motion).

While the equipment transporting system of the present invention can be used to support various different types of equipment requiring movement along a desired track, the present transporting system primarily relates to the field of stabilized camera tracking systems, and is particularly useful in connection with the remote-controlled, self-propelled transport of relatively small (including miniaturized), broadcast-quality video cameras. The detailed description which follows will be given in this context, with the understanding that such improvements will be equally useful in other applications exhibiting similar needs and equipment limitations.

For purposes of the description which is to follow, the term "camera" is intended to mean any image recording device which can be directed in a specific fashion to capture an image, or sequence of images, either in the same direction or in different directions. The camera may exhibit a "field of view" which is the angular size and shape of the view it apprehends, or may be aimed in a simple linear fashion, operating with respect to a given point. However, it is to be understood that use of the term "camera" is not intended to restrict the types of devices other than cameras (i.e. "equipment") which may be employed in accordance with the present invention, but only to indicate the general characteristics of a device requiring isolation from at least a part of the spectrum of unintentional motions which can be induced in the course of its transport.

The terms "tracking", or "camera tracking", refer to mechanical translation of the equipment (i.e., the camera) through space, serially along one or more curved or straight lines (in any direction).

The term "monorail" refers to an essentially tubular, single rail. The monorail can be supported either from below, or hung from above, for presenting a round tubular surface to the drive wheels and for engaging the passive (so-called "bogey") wheels of the drive car.

The terms "tilt" and "pan" refer to angular motions of the camera as its lens is caused to move up and down, and side-to-side, respectively, in conventional manner.

The term "pitch" refers to motion of the equipment support of the transporting apparatus about a horizontal axis perpendicular to the rail, and intersecting the center line of the rail.

The term "yaw" refers to motion of the equipment support of the transporting apparatus about a vertical axis perpendicular to the rail, and intersecting the center of the rail.

For further detail regarding preferred embodiments of the transporting system of the present invention, reference is made to the description which is provided below, taken in conjunction with the following illustrations.

DETAILED DESCRIPTION OF PREFERRED EMBODIMENTS

Figure 1:
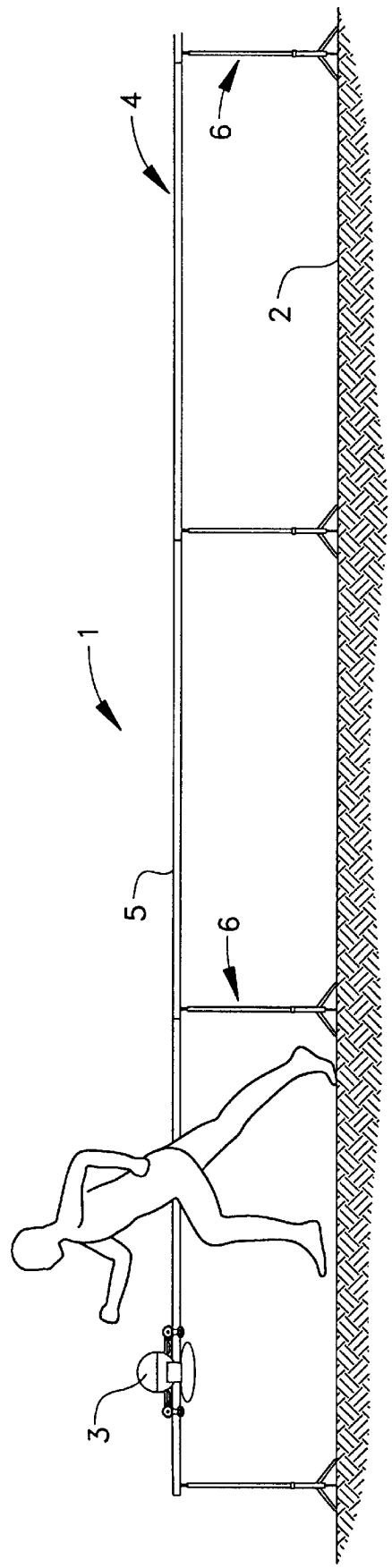
FIG. 1 is an elevational view showing a ground mounted implementation of the transporting system of the present invention, for purposes of tracking horizontal movements.

FIG. 1 shows a typical installation for the equipment transporting system 1 of the present invention. In this configuration, the transporting system 1 is ground-deployed, horizontally traversing a desired surface 2. The major components comprising the transporting system 1 include a transport 3, and a rail system 4 for supporting the transport 3 above the surface 2 and for directing the transport 3 along the rail system 4. The surface 2 may be a level surface, as shown in FIG. 1, or a sloping or irregular surface (not shown).

The rail system 4 is generally comprised of a single rail 5 (or monorail) which is engaged at spaced locations by a plurality of supports 6 for maintaining the rail 5 at a desired position (height and track) above the surface 2. The rail 5 is preferably substantially tubular in cross-section (e.g., with a diameter on the order of 1.5 inches), and is preferably implemented in plural sections (e.g., 6-foot sections) having ends which can be interconnected to develop an outer surface which is as free as possible of local irregularities (particularly at the interconnecting junctions). The rail 5 may be simply tubular in cross-section, or may include projections, grooves or flats for directing structures of the transport 3 as will be discussed more fully below. Any of a variety of materials may be used to form the rail 5, although lightweight materials such as aluminum or carbon fiber composites are preferred for ease in handling.

Figure 2:
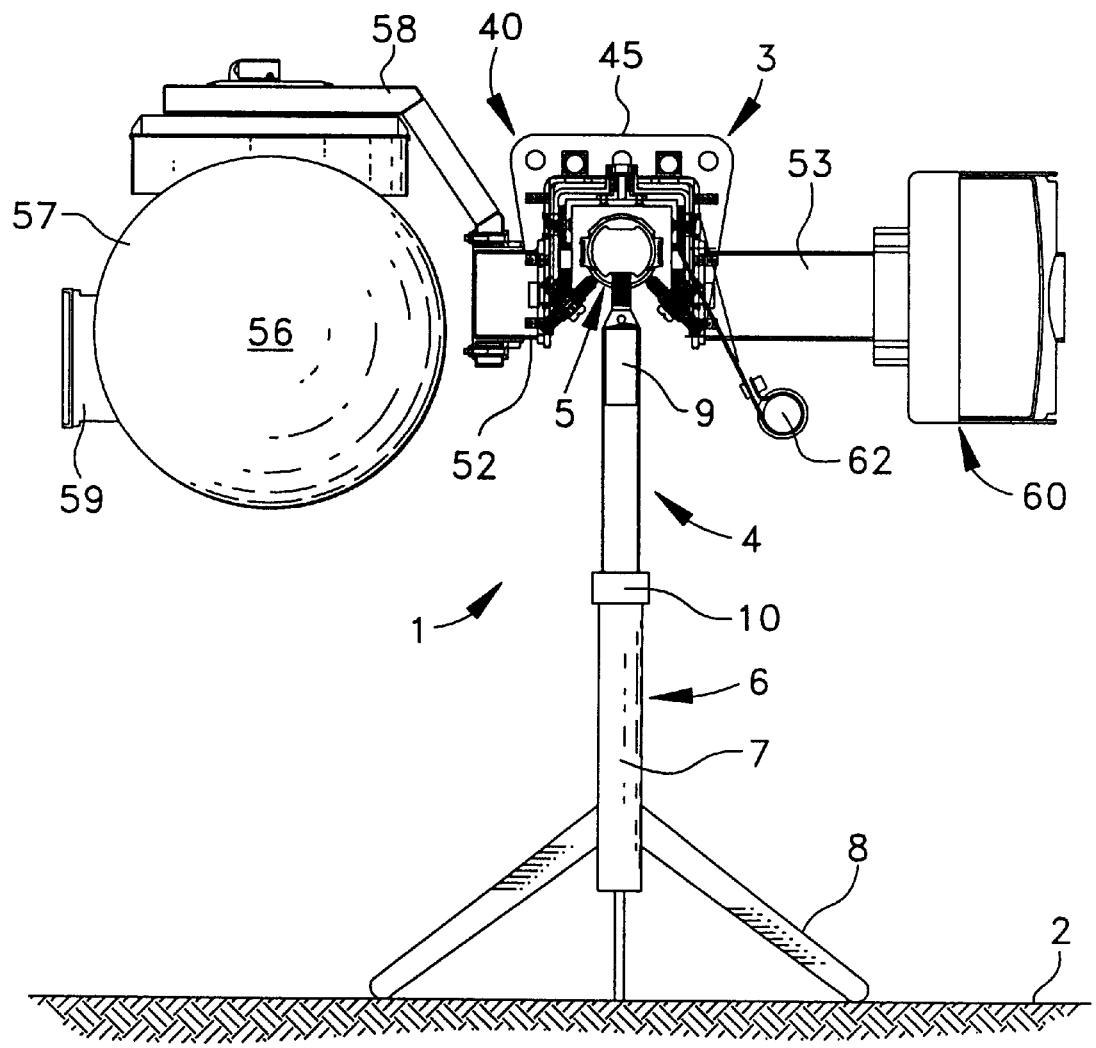
FIG. 2 is an end view of the transporting system of FIG. 1.

Referring to FIG. 2, the supports 6 essentially constitute a plurality of otherwise conventional "light-stands" for suitably engaging the rail 5. To this end, each support 6 includes a body 7, one end of which is provided with a series of legs 8 (or other suitable structures for maintaining the body 7 in an upright orientation), and the other end of which includes a mounting 9 for connecting each support 6 with the rail 5. Each of the supports 6 is preferably provided with suitable adjustments for positioning the supports 6 upon the surface 2 and to permit adjustments of the rail 5 relative to the surface 2. To this end, the body 7 is preferably capable of telescoping adjustment (note the collar 10) so that the rail 5 can be adjusted in height relative to the surface 2. A threaded (vernier) adjustment can also be used for similar purposes, if desired, although a telescoping adjustment of the supports 6 should be sufficient for most applications. Similarly, each support 6 can be provided with suitable means (e.g., eccentric mountings, x-y tables, etc.) for developing translational adjustments of the rail 5 relative to the surface 2. However, sufficient lateral adjustment of the rail 5 should in most cases be sufficiently achievable by simply moving the supports 6 laterally along the surface 2.

Figure 4:
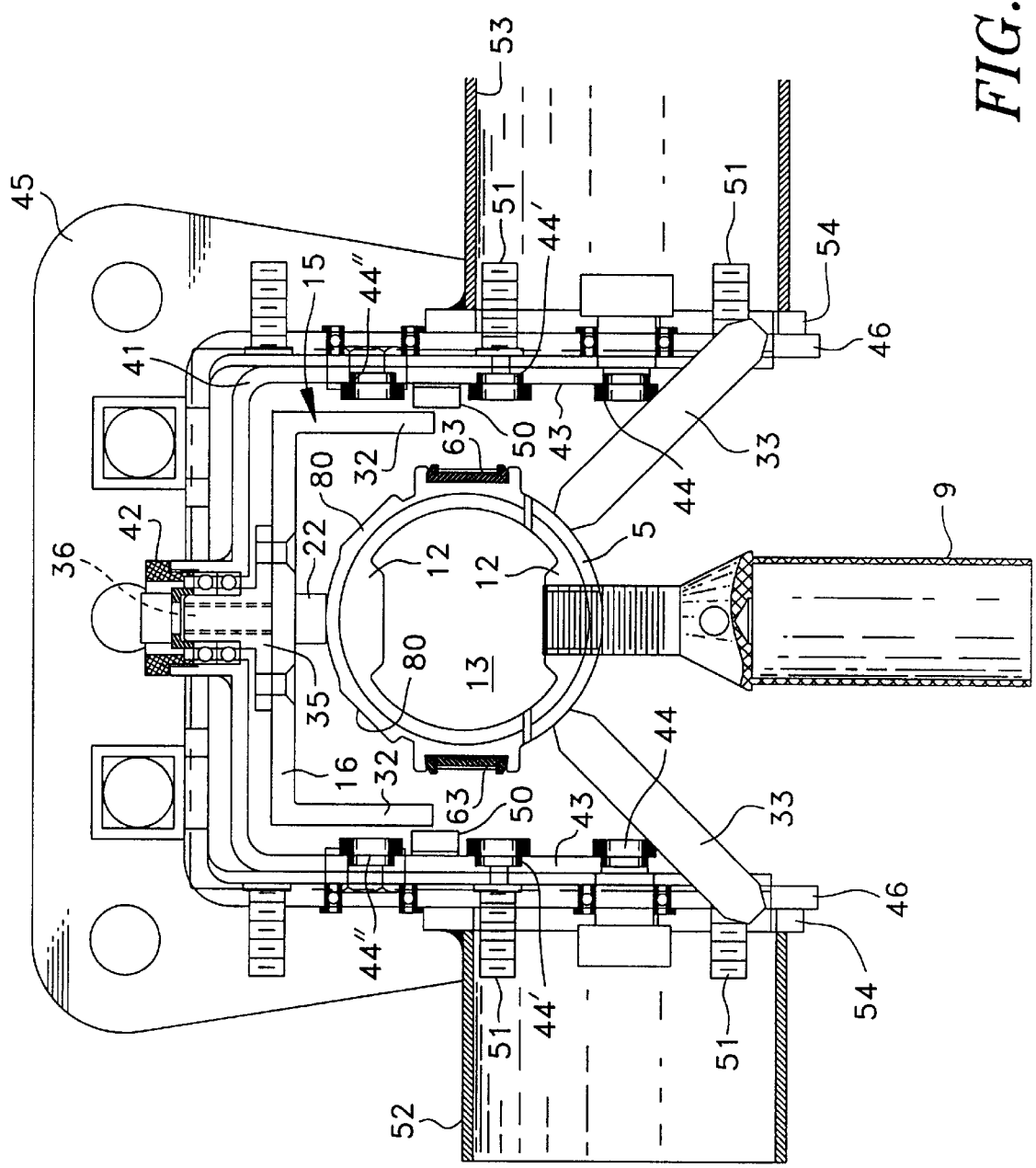
FIG. 4 is an enlarged, partial, sectional view of the interface between the rail, the drive car and the equipment support of the transporting system.
Figure 5:
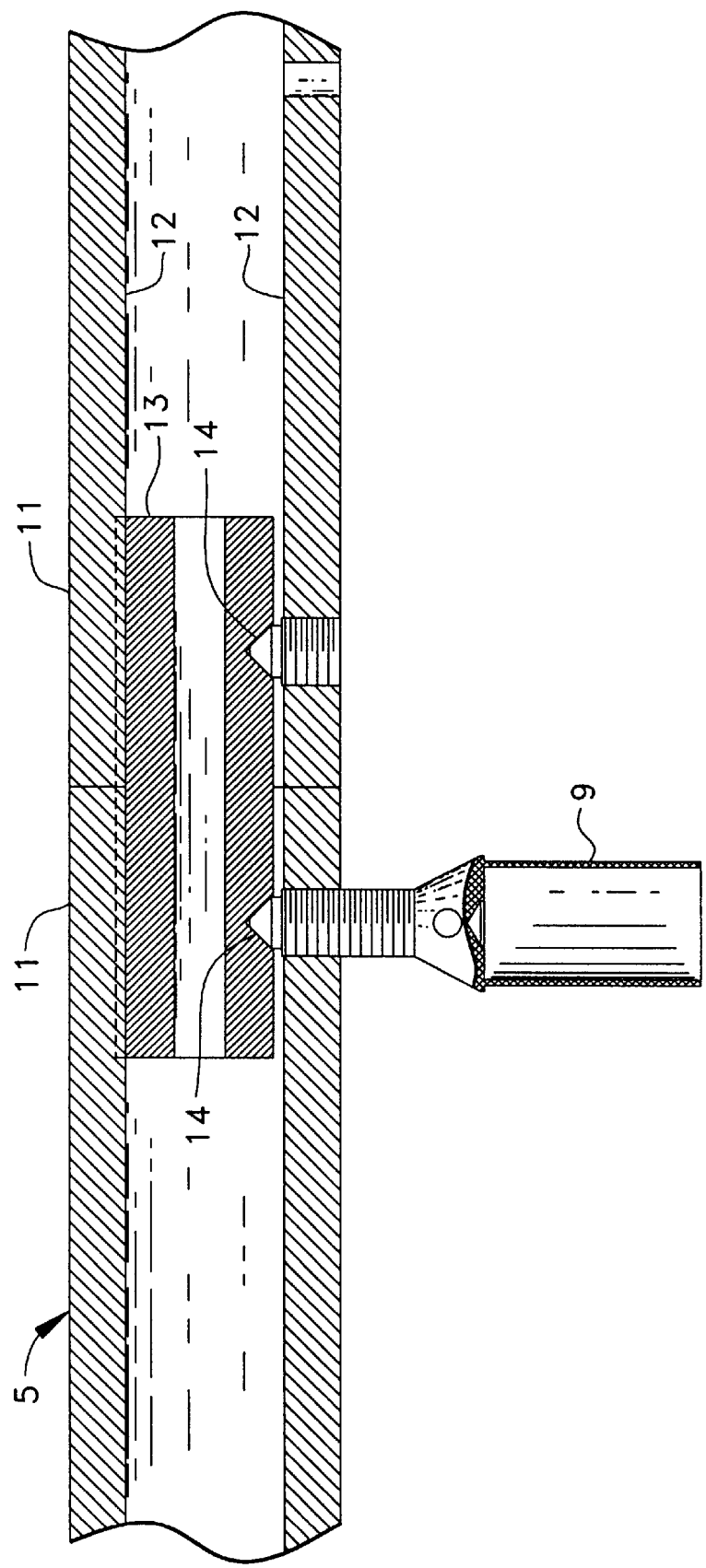
FIG. 5 is a partial, cross-sectional view of the rail of the transporting system, showing the coupling of two rail sections.

As previously indicated, the rail 5 is preferably comprised of plural sections. Threaded or sliding (frictional) couplings may be used to join the several sections to form the rail 5, if desired. However, for ease of assembly, a preferred coupling for joining the several sections of the rail 5 is shown in FIG. 5 (referring also to FIGS. 2 and 4). In this configuration, each section 11 of the rail 5 is provided with a uniform cross-sectional configuration, which additionally allows the sections 11 to be conveniently manufactured (e.g., by extrusion). The inner surface of each section 11 includes a pair of projections 12, and is configured to slidingly receive a junction block 13 having a corresponding cross-sectional shape. Each junction block 13 includes a pair of detents 14, one for receiving a set screw associated with a first section 11 of the rail 5, and another for receiving the threaded end of the mounting 9, for engaging a second section 11 of the rail 5. The mounting 9 in turn rests upon one of the supports 6, as previously described.

By tightening the set screw and the threaded end of the mounting against the junction block 13, the junction block 13 is caused to engage the respective ends of the sections 11 of the rail 5, yielding a secure junction of elements. The combined (and corresponding) features at the resulting junction (the projections 12 and the corresponding shape of the blocks 13) cause the ends of the sections 11 to be closely and carefully aligned with each other, developing a substantially seamless connection of elements and presenting a smooth and continuous rail for receiving the transport 3.

Following assembly of the foregoing elements, the rail 5 is aligned relative to the surface 2 by performing appropriate adjustments at each of the supports 6. A simple yet careful adjustment of the rail 5 (in longitudinal alignment) is made possible, using the supports 6, to position the rail 5 at a desired height above the smooth surface 2 shown in FIG. 1, or to provide a compensated adjustment of the rail 5 above an irregular surface. It has been found to be particularly useful to establish proper alignment of the rail 5 by "sighting" the rail 5 along a laser beam, and by suitably adjusting the supports 6 to bring the rail 5 into alignment with the laser beam to establish a longitudinal transport path which is suitably positioned to capture whatever moving event is to be shot with the transport 3.

The transport 3 is adapted for engagement with the rail 5, for transport along the rail 5 following the adjustment procedures previously described. To this end, and referring to FIGS. 2 and 3, the transport 3 is generally comprised of a car and an equipment support 40 which is mounted in transverse relation to the car 15. Movements of the transport 3 along the rail 5 are accomplished with the car 15, responsive to suitable control signals which will be discussed more fully below. The equipment support 40 receives the various components which are to be moved along the rail 5 responsive to operations of the car 15, including the primary equipment to be transported (in the case illustrated, a camera system) and associated equipment for powering the transport 3, for operating the car 15, and for operating the primary equipment associated with the equipment support 40.

Figure 6:
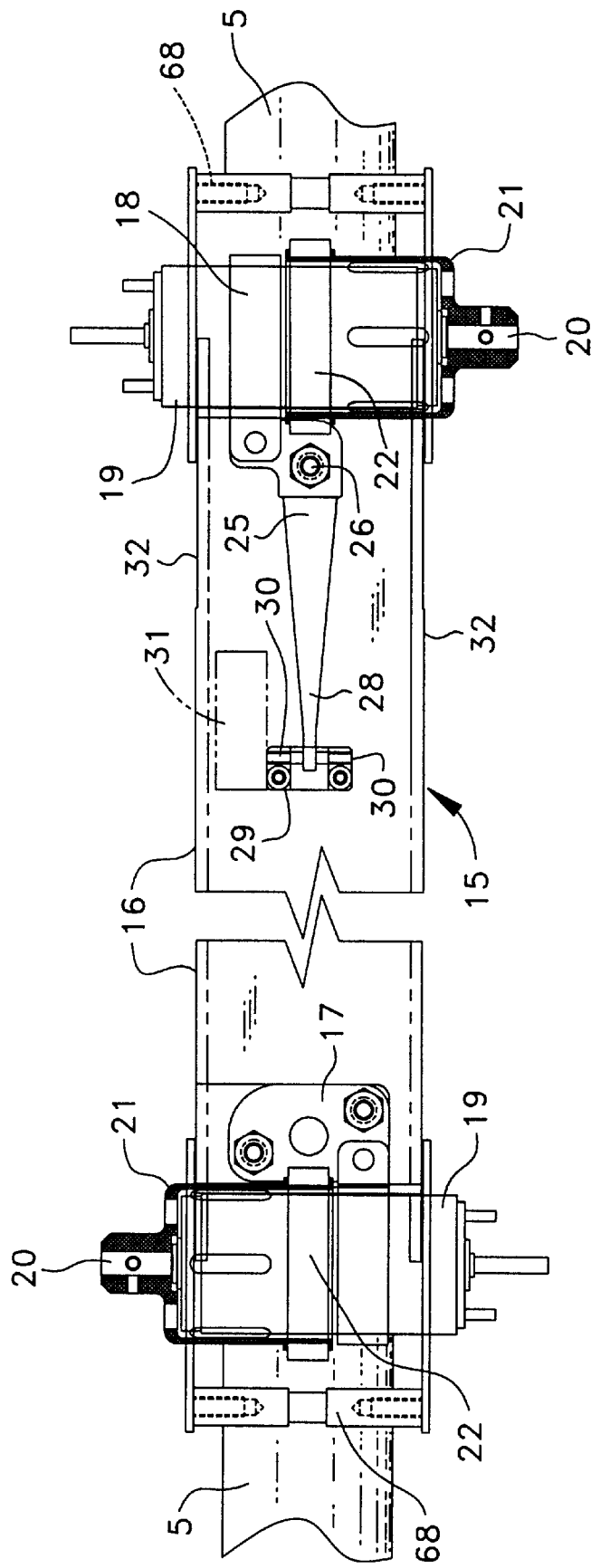
FIG. 6 is a partial, top plan view of portions of the drive car, showing the drive motors and an adjustable mechanism for aligning and/or steering the apparatus.
Figure 7:
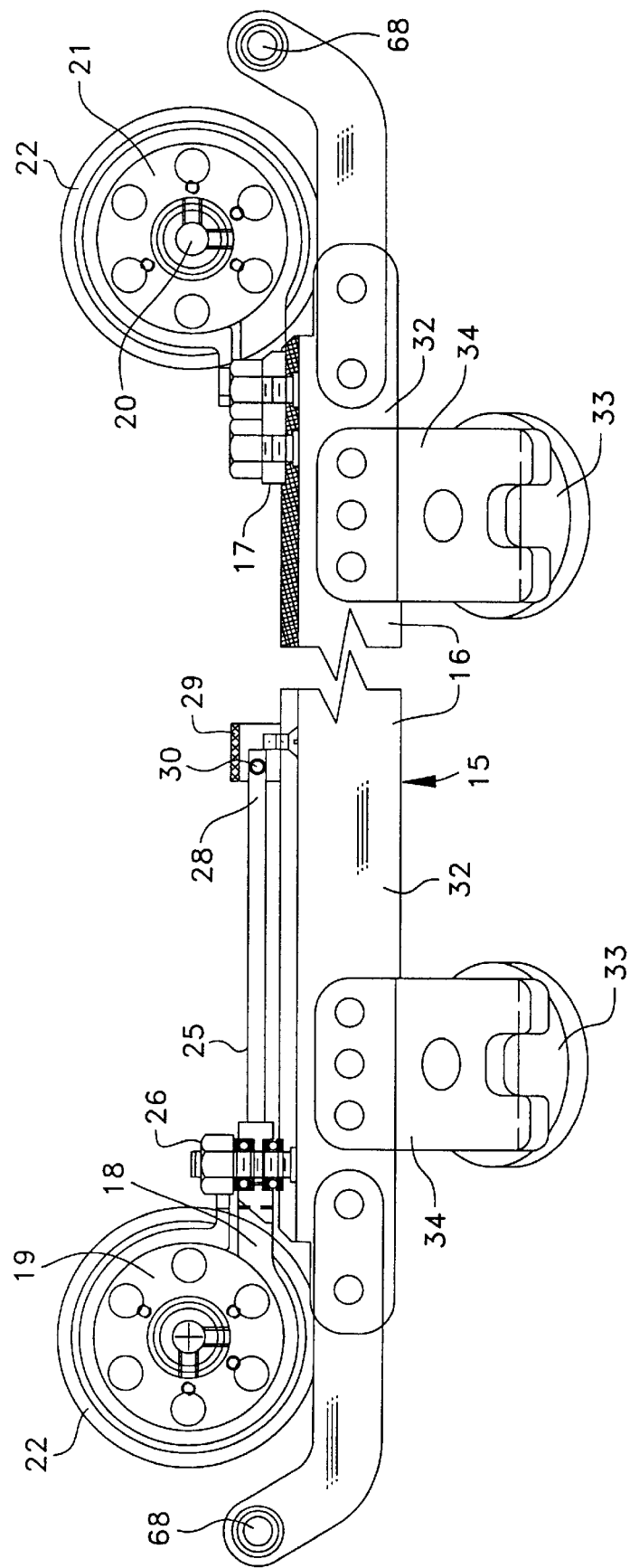
FIG. 7 is a side elevational view of those portions of the drive car which are shown in FIG. 6.

The car 15 is generally defined by a U-shaped bracket 16 for overlying the rail 5. Relatively wide tolerances are preferably established between the bracket 16 and the rail 5 to avoid potential contact (rubbing) between the two structures. Each opposing end of the bracket 16 is provided with a mounting 17, 18 for receiving a drive motor 19. Each drive motor 19 is readily implemented with any of a variety of available motors (preferably DC motors), and is preferably laterally centered above the bracket 16. To this end, and referring also to FIGS. 6 and 7, the shaft 20 of each drive motor 19 is fitted with a bell housing 21 which is capable of engaging the shaft 20, and which overlies portions of the drive motor 19. The end of the bell housing 21 opposite its connection to the shaft 20 is fitted with an elastomeric tire 22 which, due to the resulting interaction between the drive motor 19 and the bell housing 21, is positioned substantially along the center line of the bracket 16 directly above the center (the longitudinal axis) of the rail 5. The motors 19 are cantilevered from the ends of the bracket 16 so that the tires 22 are in direct engagement with the outer (top) surface of the rail 5.

One of the mountings 17, for receiving a first one of the drive motors 19, is fixed relative to the bracket 16. The remaining mounting 18, for receiving the second of the drive motors 19, is preferably made adjustable relative to the bracket 16 to permit the orientation of the drive motor 19 (and the tire 22) to be varied (rotated) relative to the bracket 16. This, in turn, provides for adjustment of the contact developed between the tire 22 of the associated drive motor 19 and the rail 5. To this end, the mounting 18 is connected to the bracket 16 for rotation about a pivot point which is substantially at the longitudinal center of the bracket 16, and accordingly, the car 15 and the center of the rail 5. A bell crank mechanism 25 is operatively connected with the adjustable mounting 18 to accomplish rotations of the mounting 18 relative to the bracket 16. The bell crank 25 is pivotally connected to the bracket 16, at 26, and is fixed to the mounting 18. As a result, transverse movements of the tip 28 of the bell crank 25 cause rotation (about the pivot 26) of the mounting 18 and the drive motor 19 which it supports, as previously described.

In the configuration shown, a vernier adjustment 29 is fixed to the bracket 16 for engagement with the tip 28 of the bell crank 25. The vernier adjustment 29 includes an opposing pair of set screws 30 which can be used to adjust the lateral position of the tip 28, and to lock desired adjustments in position. If desired, similar adjustments may be accomplished in automated fashion, responsive to a motorized screw drive or escapement mechanism (shown in phantom at 31). The selected mechanism may either be operated by remote control (e.g., radio controlled) to allow for dynamic "steering" of the car 15, or may be operated responsive to on board level-sensing equipment (i.e., servo controlled responsive to a suitable level sensing device such as a level detector, for horizontal deployments, or responsive to a flux-gate sensor for vertical deployments). In any event, adjustment (rotation) of the mounting 18 can operate to effectively guide the car 15 along the rail 5 irrespective of angular irregularities in contact between the car 15 and the rail 5, as will be discussed more fully below. In practice, it has been found that the vector sum of all such irregularities can be compensated with a single adjustment of any one of the available wheels (in this case, by adjusting the angle of contact between the tire 22 associated with the mounting 18 and the rail 5).

In addition to the tires 22, which are located above the bracket 16, the car 15 is provided with additional rolling structures for contacting the underside of the rail 5, which are preferably associated with the sides 32 of the bracket 16. Such additional points of contact are preferably developed using so-called "bogey" wheels (passive rollers) which are supported by and which extend from the sides 32, into engagement with the rail 5. A pair of such bogey wheels 33 is preferably associated with each end of the bracket 16. The bogey wheels 33, as well as the tires 22, preferably extend substantially radially from the center of the rail 5, establishing a 3-point contact with the rail 5 which is effective in smoothly transporting the car 15 along the rail 5 responsive to operations of the drive motors 19. To this end, each of the bogey wheels 33 is preferably associated with the sides 32 of the bracket 16 using adjustable mountings 34 which operate to fix the bogey wheels in their preferred orientation (at a 45° angle), yet which permit the bogey wheels to be adjusted in position (radially and, if desired, tangentially) relative to the rail 5. The bogey wheels 33 are preferably adjusted to in each case establish a point contact, tangential with the rail 5.

A pivot block 35 is attached to the top of the bracket 16 at a position which is midway between the mountings 17, 18, and the drive motors 19. The pivot block 35 includes a centrally disposed pivot 36 which is located along the longitudinal axis of the bracket 16, and accordingly, which is in alignment with the central longitudinal axis of the rail 5. The pivot block 35 receives the equipment support 40, which will now be described in further detail.

To this end, an intermediate bracket 41 is provided, having a centrally disposed bearing 42 for engaging the pivot 36. Extending transversely from the bearing 42, the intermediate bracket 41 includes an opposing pair of legs 43 which generally overlie the bracket 16. Each of the legs 43 is pivotally connected, at 44, with the opposing sides 46 of a bridge 45, which also overlies the intermediate bracket 41 and the bracket 16 of the car 15. Resulting from such interconnection, the bridge 45 is disposed transverse to the car 15 and to the rail 5 which receives it. In addition, the bridge 45 and the car 15 are isolated along two mutually orthogonal axes, allowing the two structures to pivot relative to one another and in two independent orientations (yaw and pitch). The bridge 45 is preferably provided with ribs 47 for added support and structural integrity.

As a result, the equipment support 40 is made capable of pivoting relative to the car 15 (and the rail 5) along two mutually perpendicular (orthogonal) axes. Such movements are preferably controlled to yield an improved result. To this end, and referring to FIG. 8, a cooperating series of springs 48 and dashpots 49 are preferably connected (in opposing directions) between the pivot 36 and fixed portions of the bridge 45. Similarly, as shown in FIG. 4 a pair of leaf springs 50 preferably extend from the sides 46 of the bridge 45, along (and for contact with) the sides 32 of the bracket 16. Dampening between the leaf springs 50 and the bracket 16 can be accomplished using an elastomeric material (e.g., "Sorbathane™", or equivalent). Other interconnecting mechanisms may be used to achieve a similar result. In any event, interaction between the equipment support 40 and the car 15 should be sufficiently strong to avoid uncontrolled movement of the two structures relative to one another, yet sufficiently weak to prevent undesirable movements of the equipment support 40 responsive to operations of the car 15.

Figure 8:
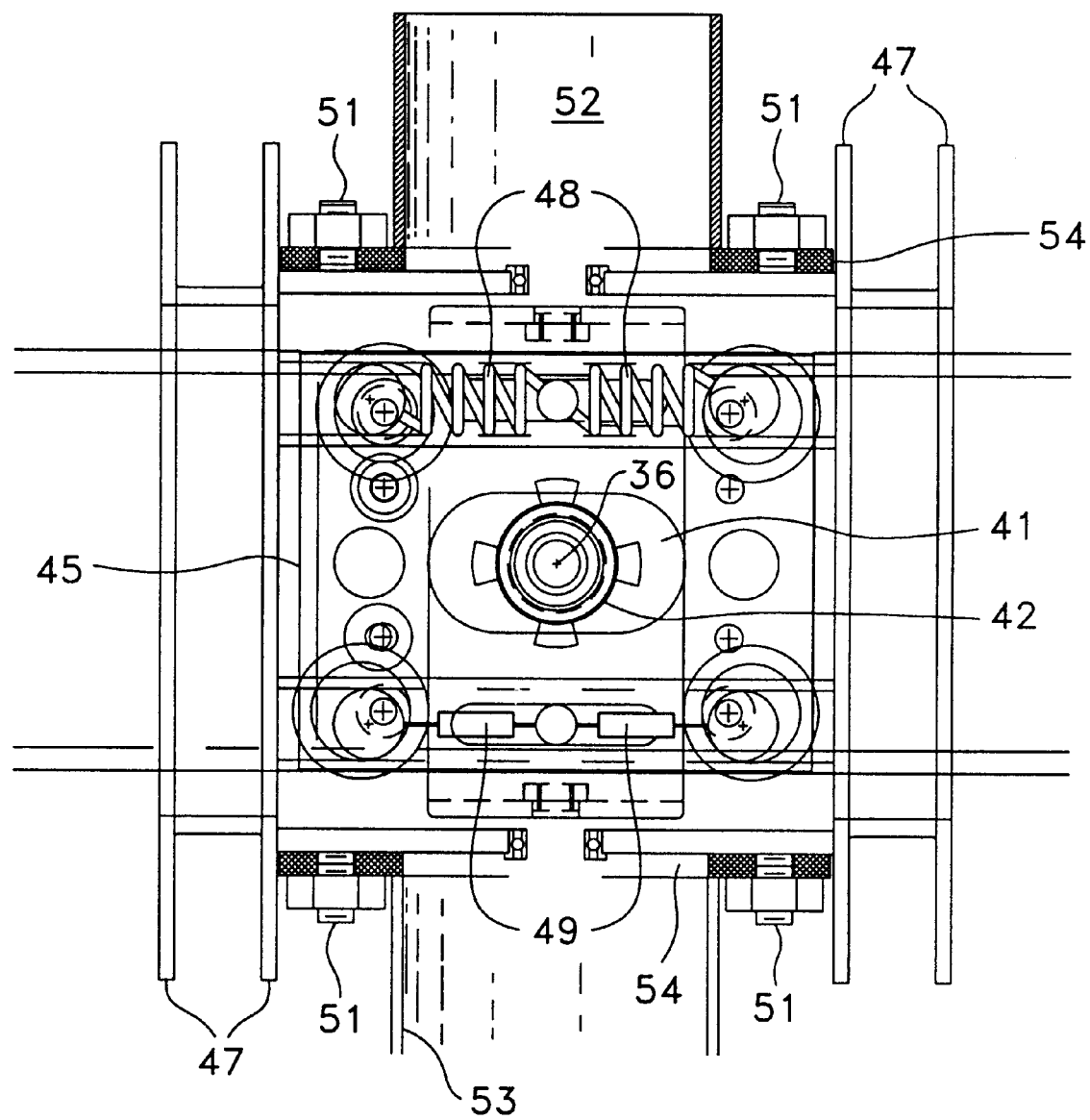
FIG. 8 is a top plan view of the interface shown in FIG. 4.
Figure 9:
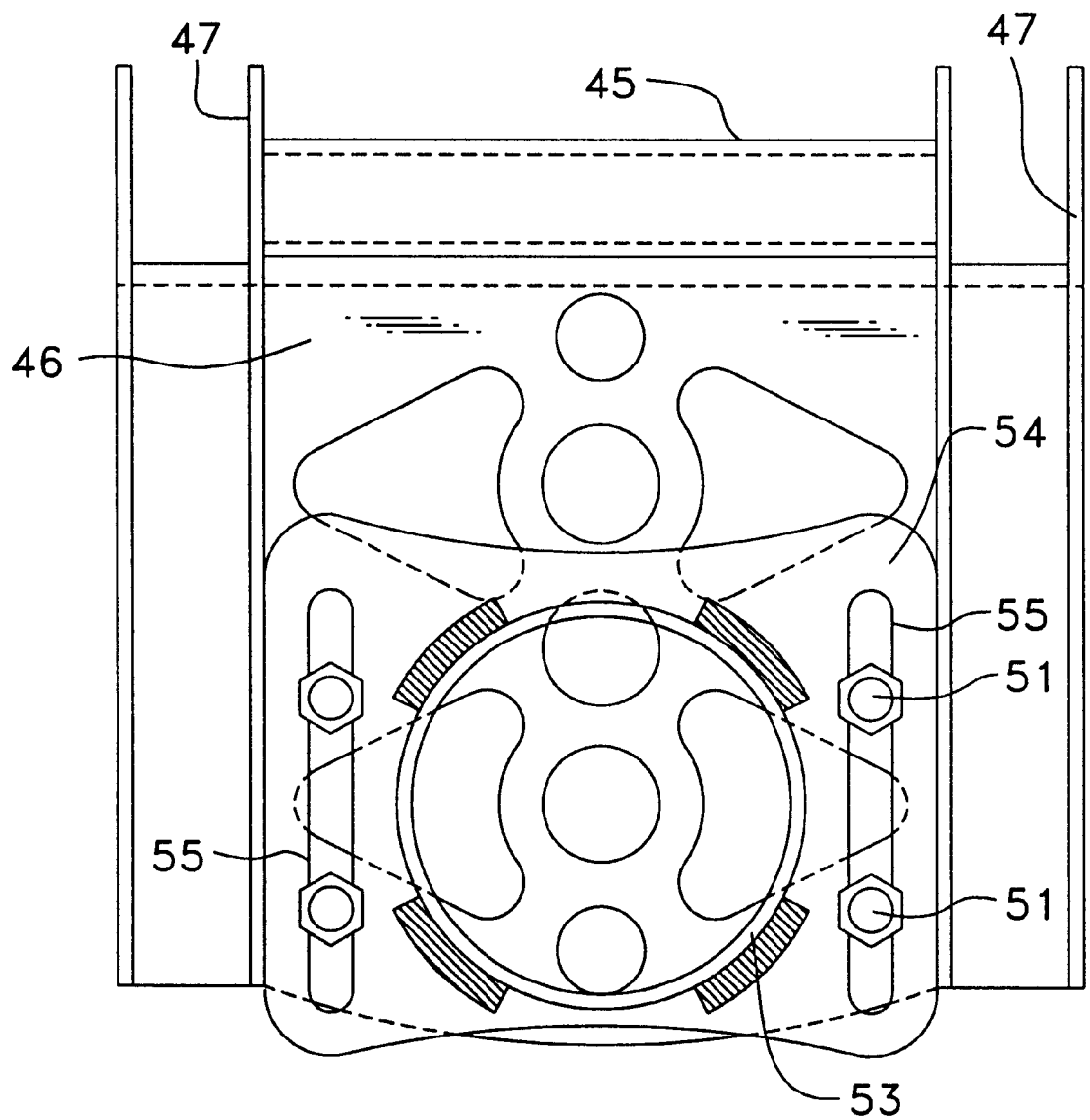
FIG. 9 is a partial, side view of portions of the equipment support shown in FIG. 4, illustrating structure for performing adjustments of the equipment support.

Referring to FIGS. 8 and 9, each of the sides 46 of the bridge 45 include a series of mountings 51 for engaging a pair of extensions 52, 53, which are preferably cylindrical in shape. Each extension 52, 53 terminates in a flange 54 having slots 55 for variable engagement by the mountings 51. The slots 55 proceed in a direction which is substantially perpendicular to the longitudinal axis of the car 15, and the longitudinal center line of the rail 5. As a result, the extensions 52, 53 are capable of being adjustably positioned along the bridge 45, with movements generally toward and away from the pivot 36 (i.e., up and down in FIG. 9). Each of the mountings 51 includes suitable fasteners for locking off the adjustment, once made. Adjustment of the extensions 52, 53, and other adjustments for causing proper operations of the transport 3, will be discussed more fully below.

One of the extensions 52 (the shorter extension shown) receives a camera system 56. Any of a variety of existing camera systems may be used for such purposes. However, in accordance with the present invention it is preferred to employ a lightweight video camera capable of suitable pan and tilt to acquire desired images as the transport 3 moves along the rail 5. The camera system 56 preferably includes an enclosure 57 formed of a lightweight material (a carbon fiber composite is particularly preferred for such purposes). A bracket 58, also preferably formed of a lightweight composite material, suitably interconnects the enclosure 57 and the extension 52. The bracket 58 includes a collar 58' for adjustably engaging the extension 52, for purposes which will be discussed more fully below. Pan and tilt of the camera system 56 is accomplished by moving the camera lens 59 within the enclosure 57 (tilt) and relative to the bracket 58 (pan). Such panning and tilting, as well as other camera support functions (e.g., focus, zoom, iris, etc.) are preferably accomplished by remote control, using radio controlled equipment which is otherwise known and available in the industry.

The opposing extension 53 (the longer extension shown) slidingly receives an enclosure 60 for housing the various components which are used to support operations of the transport 3. The enclosure 60 includes a collar 61 for frictionally engaging the extension 53, primarily for purposes of adjustment as will be discussed more fully below. Also for purposes of adjustment (to balance the transport 3), the enclosure 60 is preferably rectangular in overall configuration, with its longer dimension extending generally parallel along the car 15 and the rail 5. Apart from this, the enclosure 60 may have any shape which is suited to receiving the support equipment which is needed.

Support equipment housed by the enclosure 60 can include video processing equipment for interfacing with the camera system 56, equipment for remotely controlling operations of the transport 3 and the camera system 56 (e.g., translation along the rail, pan, tilt, focus, zoom, iris, etc.), and equipment (batteries, amplifiers, power supplies, etc.) for powering the transport 3 and the camera system 56. For ease in balancing the transport 3, as will be discussed more fully below, heavier equipment (such as the power supply) is preferably subdivided and placed at the opposing (farthest) ends of the enclosure 60 so that the resulting (spaced) mass will assist in increasing the rotational inertia of the overall system. The remaining circuitry is preferably more centrally disposed within the enclosure 60.

Appropriate means must also be provided for transmitting video signals received by the camera system 56 to a desired location, in conjunction with movements of the transport 3 along the rail 5. This can be accomplished using radio or microwave transmissions. However, in practice it has been found to be preferable to employ modulated laser transmissions for such purposes. To this end, a laser 62 is mounted to the transport 3 (in the case shown, to the bracket 16 of the car 15) and is fixed in general alignment with the longitudinal axis of the rail 5. Video processing equipment associated with the enclosure 60 is used to receive signals from the camera system 56, and to modulate the laser 62 responsive to the video signals developed by the camera system 56. The resulting beam, emanating from the laser 62, is caused to encounter a corresponding receptor located at either end of the rail 5. The transport 3 is preferably provided with sensors for automatically stopping the transport 3 at either end of the rail 5, to protect the receptor (as well as the transport 3). Since the rail 5 can have a significant length, and since it is possible for the laser 62 to encounter limited angular movement resulting from operations of the transport 3, the laser 62 is preferably defocused to a limited extent to ensure that the modulated laser beam is suitably received by the corresponding receptor.

To achieve the operations which will be required of the transport 3, the power requirements for the system will generally exceed the amount of power which can normally be provided using batteries of a size appropriate to the transport 3. For this reason, and in its preferred embodiment, the rail 5 is preferably provided with charging strips 63 which are capable of carrying a current, and the transport 3 is preferably provided with pick-ups 64 for engaging the charging strips 63 and for deriving a current from the charging strips 63. The pick-ups 64 communicate with the power supply associated with the enclosure 60, yielding sufficient average power for charging the batteries and operating the transport 3 without unduly increasing the overall size and weight of the system.

Having described the various structural components of the transporting system 1, the manner in which these various structural components cooperate with one another to achieve their intended result, as well as use of the transporting system 1, will now be described. To this end, the equipment support 40 preferably includes a camera system 56 having (otherwise conventional) servo motors adapted to pan and tilt the lens 59 about the center of balance of the camera system 56. In this way, the transport 3 will not become unbalanced as the direction of the camera lens is remotely controlled.

The camera system 56 and the counterbalancing equipment enclosure 60 are interconnected by the bridge 45, providing a rigid support which arches up and over the car 15. The tires 22 and the bogey wheels 33 of the car 1S in turn surround the rail 5. As previously indicated, the bridge 45 (and accordingly, the equipment support 40) pivots freely about the two laterally disposed bearings 44 positioned on either side of the intermediate bracket 41. The pivots 44 are centered on a line which passes horizontally through the rail 5, preferably about 0.25 to 0.75 inches below the longitudinal centerline of the rail 5. The intermediate bracket 41 is also free to rotate about the pivot 36 extending vertically from the bracket 16 of the car 15.

Figure 10:
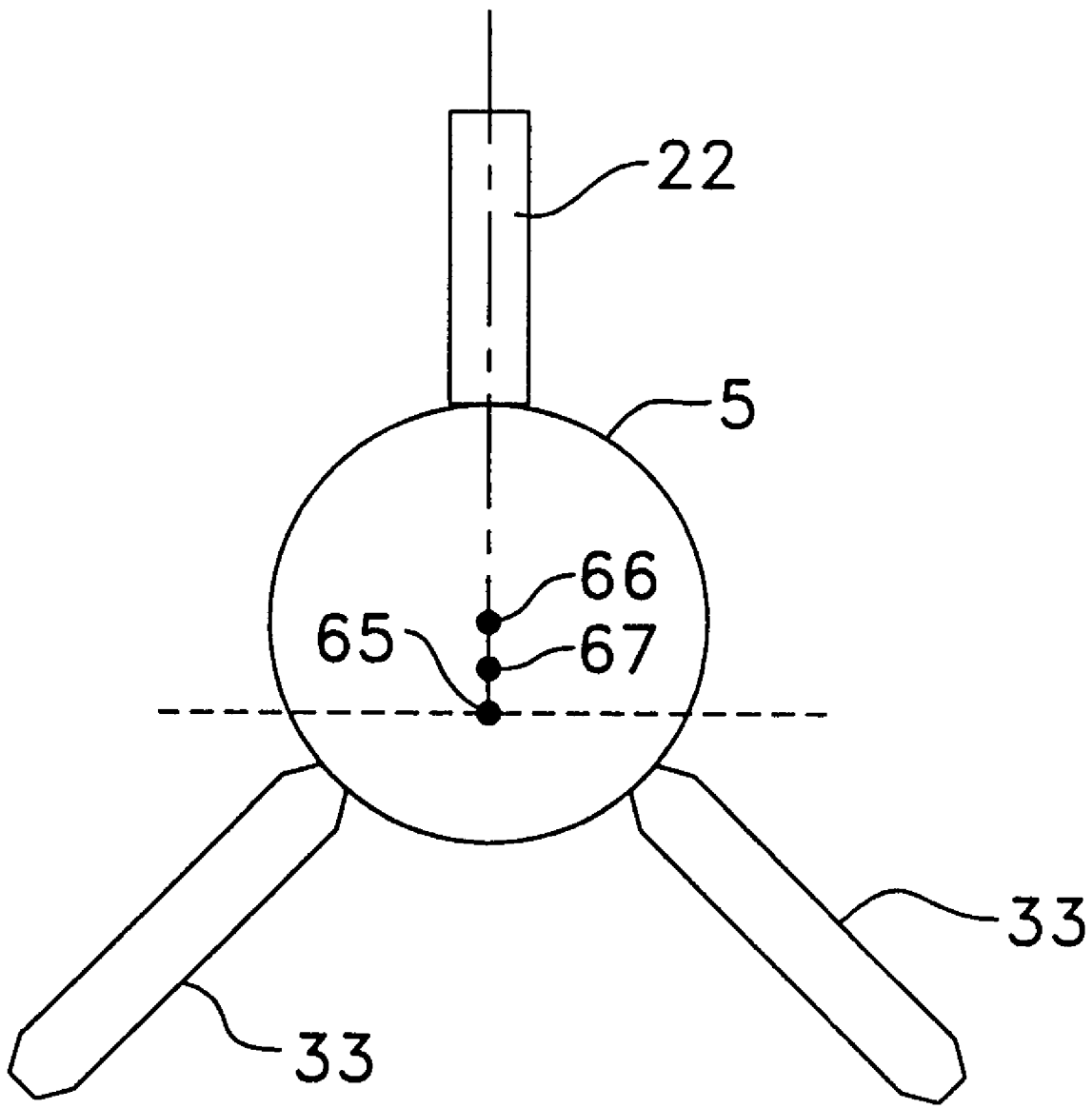
FIG. 10 is a schematic view showing adjustment of the transporting system for achieving proper operation.

As a result, and referring to FIG. 10, the equipment support 40 is pivoted with respect to the car 15 about two mutually perpendicular axes which cross at a point 65 about 0.25 to 0.75 inches directly below the longitudinal center 66 of the rail 5. The masses of the equipment support 40 are precisely balanced about this point of intersection, so that the equipment support (and the equipment) is placed in a neutral balance. Due to this freedom to pivot, and a reasonably neutral balance of components, it is only necessary to lightly bias (using the springs 48, and the dashpots 49 to prevent oscillation) the equipment support 40 about the lateral pivots 44 to maintain a level pitch (fore and aft), and to likewise only lightly bias (using the leaf springs 50) the equipment support 40 about the vertical pivot 36 to be aligned in yaw with the direction of travel of the transport 3.

In such "floating" (neutral) balance, the car 15 can accelerate and decelerate (both easy and hard) along the rail 5 and the equipment support 40 will not pitch up or down because the impetus to move is introduced at the center of balance of the assembly. Because the equipment support 40 is relatively massive in comparison to the forces which tend to keep the transport 3 aligned along its direction of travel, deviations are resisted in pitch and yaw due to the quick and small angular changes which are characteristic of the car 15 as it moves between and along each of the plural segments of the rail 5.

Due to structural limitations, the sections of the rail 5 generally will not remain perfectly linear when deployed (e.g., when suspended between the adjacent supports 6 associated with the rail 5). As an example, and for the ground-deployed embodiment of FIG. 1, the sections of the rail 5 will typically exhibit ⅛ inch deviations due to slight errors in alignment made when installing the rail 5. Also exhibited are ¹⁄₁₆ inch deflections as the transport 3 (which typically weighs on the order of 14 pounds) passes along the rail 5. This tends to result in complex, compound angular pitch and yaw vibrations. However, such vibrations are easily accommodated by the damped angular isolation of the balanced equipment support 40.

The equipment support 40 (and accordingly, the camera system 56) are kept level because the entire structure (the transport 3, including the car 15) can only roll side-to-side around the longitudinal center 66 of the rail 5. Moreover, such roll can only occur when the car 15 is in motion. At rest, the friction of the tires 22 (front and rear) and the corresponding bogey wheels 33 (disposed 45° to either side) prevents the transport 3 from rolling. When in motion along the rail 5, the transport 3 is free to roll from side to side. However, this does not occur because the overall center of balance 67 of the equipment support 40 and the car 15 (combined) is at a point about 0.25 inches below the center 66 (the longitudinal axis) of the rail 5, which is sufficiently bottom-heavy to keep the assembly level. At the same time, such balance is close enough to being neutral to provide a slow pendular period, so that even if a slight precession occurs (e.g., due to tilting of the camera or acceleration of the drive motors, or responsive to a gust of wind), the period is sufficiently slow that any deviation from, and back to level is virtually imperceptible. Accordingly, the camera system 56 is not referenced to level by the rail 5 (which itself may not be perfectly level), and the transport 3 experiences the non-volatile effect of balance, even around a featureless tube. As a result, the transport 3 is not subject to increasing vibrations and deviations from level, even when traveling at a high rate of speed along the rail 5.

Because of this, remarkable stability of the device is achieved without significant added weight, and in particular, without the added weight of a mass gyro. Similar benefits are achieved, without such added structures, due to the combined effect of the several damped and offset axes (pivots) of the transporting system 1. To achieve this, the roll axis is located at the center of the rail, at 66, and is damped by the friction of the tires 22 when the transport 3 is at rest, and by the slight bottom-heaviness (and accordingly, the slow pendular period) of the transport 3 when in motion. The pitch axis, at 65, is constituted by the horizontal axis between the lateral pivots 44 on either side of the bridge 45 (which, noticeably, does not intersect with the roll axis). The yaw axis is constituted by a vertical axis (about the pivot 36) perpendicular to the rail 5, which intersects the center of the rail 5 and the pitch axis. The damped isolation in all three such axes effectively stabilizes the equipment support 40 (and accordingly, the camera system 56) to the extent that even at moderate to high rates of speed along the rail 5, the camera system 56 is not subject to severe angular deviations in the shot obtained. The transport 3 can lose its isolation when the transport speed is extremely slow. However, in this case, the resulting angular deviations are similarly slow and virtually unnoticeable.

In operation, and responsive to use of the transporting system 1, it is possible for the tires 22 and/or the bogey wheels 33 to wear or change adjustment. This can cause the transport 3 to lean to either side during subsequent operations (in such case, the transport 3 will tend to roll one way in one direction of travel and the opposite way upon reverse travel along the rail 5). To overcome this, a steering adjustment is provided, and is accomplished by a fine, vernier angular adjustment of the bell crank 25 attached to the mounting 18 for one of the drive motors 19. This has the effect of neutralizing the accumulated (steering) offsets of each of the other wheels (the remaining tire 22 and the bogey wheels 33), none of which may be absolutely square with the rail 5. Adjusting the set screws 30 controlling the bell crank 25 provides a counter bias to the accumulated offsets of the remaining (fixed) wheeled elements, with the result being that the transport 3 will move in either direction along the rail 5 without rolling to either side. If desired, such steering adjustment can be performed by remote control (e.g., radio transmissions) or by servo control (e.g., responsive to a level indicator), to dynamically control deviations in roll caused by slight precession due to camera tilt or pan, transport acceleration or deceleration, or lateral gusts of wind acting on the profile of the equipment. To prevent deviations caused by lateral gusts of wind, the transport 3 may also be shielded with a cover (not shown), having a profile which coincides with the center of the rail 5, or fitted with a longitudinal fin for added stability.

The transporting system 1 is primarily intended for straight-line applications, corresponding to the configuration previously described. However, since the lateral pivots 44 that isolate against pitch deviations are positioned well below the center of the rail 5, and virtually adjacent (transversely) to the positions of the bogey wheels 33, it has been found that when going around a curved section of the rail, the forces (sideways) exerted at the center of balance of the bottom-heavy transport 3 are sufficiently opposed by the bogey wheels 33 to maintain the transport 3 upright as it traverses the curved section, making such (curved) configurations possible.

The foregoing improvements are achieved by properly balancing the various components of the transport 3 relative to the longitudinal axis (center) of the rail 5. Such adjustment will now be described in conjunction with the ground-deployed embodiment of FIG. 1. Variations of this procedure will later be described in conjunction with alternative placements of the transporting system 1.

Figure 3:
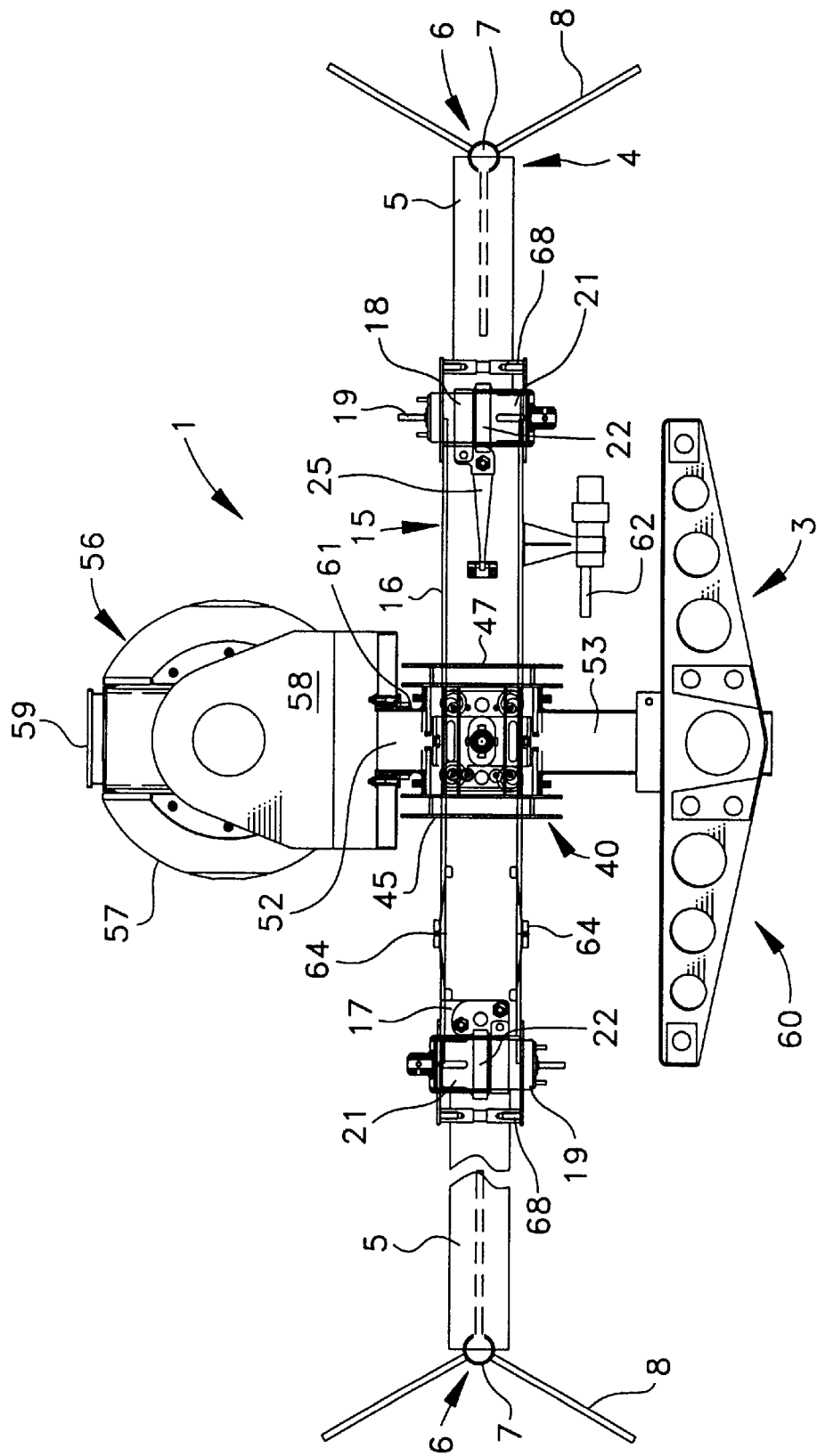
FIG. 3 is a top plan view of the transporting system shown in FIG. 2.

The first step in adjusting the transport 3 is to correctly orient the camera system 56. As previously indicated, the camera system 56 selected for use in accordance with the present invention (either conventionally available or otherwise) is preferably configured so that its panning and tilting axes pass through a single point. This point should preferably be aligned with the central longitudinal axis of the extension 52 which receives the camera system 56. The overall orientation of the camera system 56 must also be matched to the orientation of the transport 3 (in a particular application) such that the camera system 56 is in an upright position during use. In the ground-deployed installation of FIG. 1, this would call for placement of the camera system 56 as shown in FIGS. 2 and 3 of the drawings.

The second step in adjusting the transport 3 is to laterally balance the equipment support 40 about the center of the rail 5. This can be accomplished by moving the camera system 56 along the extension 52, by moving the enclosure 60 along the extension 53, or by combinations of these movements, in turn establishing a neutral balance of the equipment support 40 about the car 15 (and accordingly, the rail 5).

A third step in adjusting the transport 3 is to laterally balance the equipment support 40 about an axis perpendicular to the center of the rail 5, passing axially through the extensions 52, 53 (i.e., the axis 65). The springs 48 should be neutralized during this adjustment, to avoid potential interference with the balance which is to be established. Since the components of the camera system 56 are relatively fixed, such adjustment is best accomplished by altering the position of components associated with the enclosure 60. In particular, this is most easily accomplished by adjusting the positioning of the batteries associated with the enclosure 60 (which, as previously indicated, are preferably positioned at the outermost portions of the enclosure 60 to provide significant masses at the ends of the enclosure 60, facilitating such adjustment). Of course, other components associated with the enclosure 60 could be moved to achieve a similar result, if desired.

A fourth, and final step in adjusting the transport 3 is to balance the equipment support 40 about an axis established by the pivots 44 which connect the intermediate bracket 41 with the equipment support 40 (again, the axis 65). To accomplish this adjustment, the transport 3 is vertically suspended using one of the hangers 68 provided at the terminating ends of the car 15. In this orientation, steps are taken to move the extensions 52, 53 relative to the bridge 45, along the slots 55 provided for such purposes. Such balance can be achieved either by moving the extension 52 or the extension 53, as well as combinations of the two. However, an uneven adjustment of the extensions 52, 53 can lead to precession of the equipment support 40 during operations of the transport 3, which is to be avoided. For this reason, corresponding adjustments of the extensions 52, 53 are preferred to achieve this final adjustment of the transport 3 (essentially bringing the longitudinal axes of the extensions 52, 53 into alignment with one another).

As a result of the foregoing adjustments, the transport 3 will be neutrally balanced about a horizontal axis perpendicular to the rail 5 and positioned beneath the central longitudinal axis of the rail 5 by a distance established responsive to the location of the pivots 44 (preferably, as previously indicated, from 0.25 to 0.75 inches below the central longitudinal axis of the rail 5 to achieve an optimum result). This establishes a balanced, yet bottom-heavy arrangement for the transport 3, achieving the isolated and stabilized transport of equipment (the camera system 56) which is desired.

Figure 11:
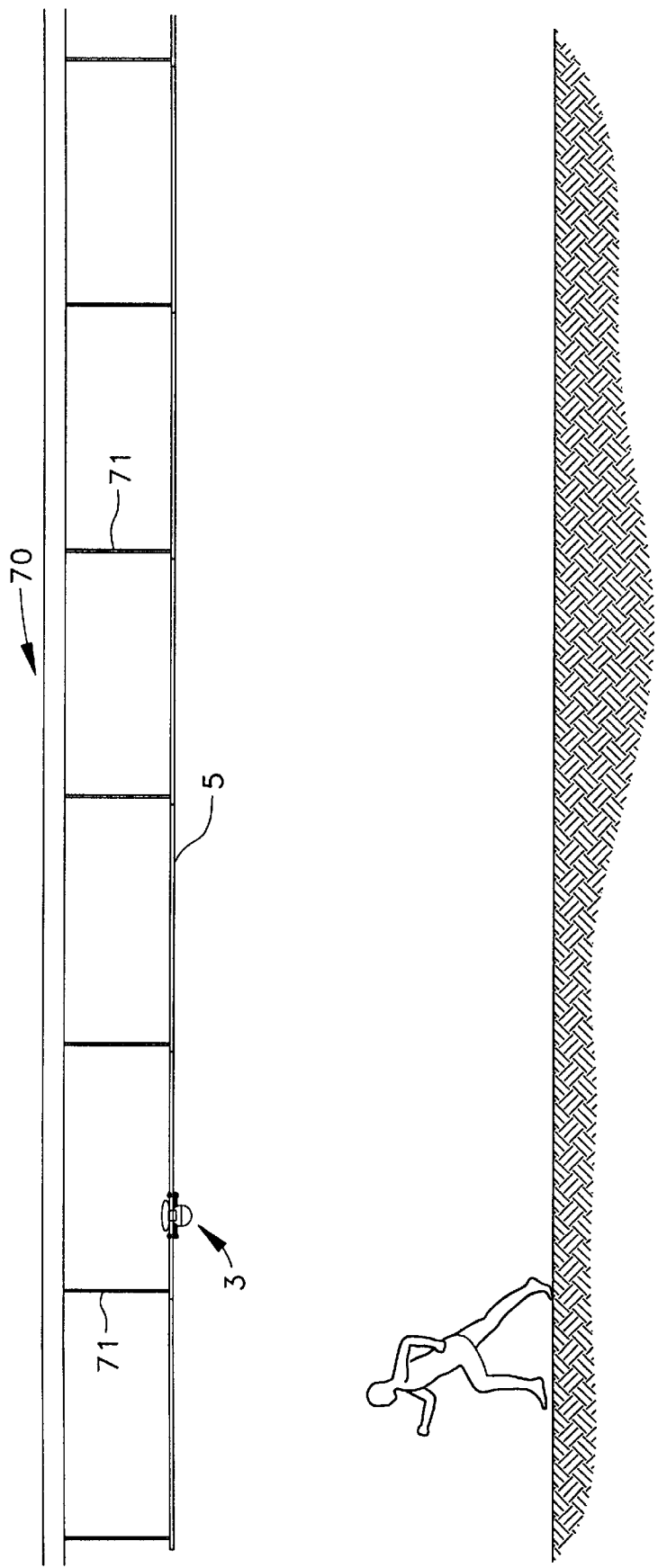
FIG. 11 is an elevational view similar to FIG. 1, showing a suspended mounting of the transporting system, in an inverted orientation.

The ground-based deployment of the transporting system 1 of FIG. 1 is only one of several configurations capable of being assumed by the system. In addition to the potential for deploying the system over smooth and irregular surfaces, as previously described, this can include a deployment of the system in different orientations. For example, FIG. 11 shows deployment of the transporting system in an inverted position, suspended from a suitable structure (ceiling, rigging, framework, etc.). The overall configuration of the transporting system 70 is substantially the same as the configuration of the transporting system 1 shown in FIG. 1. Essentially, the only structural difference between the two configurations is that the supports 6 are replaced by hangers 71, and the transport 3 is inverted in orientation. However, there are also variations in is the procedures for adjusting the transport 3 to achieve the neutral yet bottom-heavy balance which is desired for its proper operation.

For example, in this configuration, the first step in the adjustment procedure calls for the orientation of the camera system 56 to be inverted from the orientation shown in FIGS. 2 and 3, so that the camera system 56 will assume a normal, upright position when the transport 3 is suspended from the rail 5 (then in an inverted orientation). This is accomplished by reversing the extension 52 relative to the side 46 of the bridge 45 which receives the camera system 56.

It is also necessary to change the interconnection between the intermediate bracket 41 and the bridge 45, prior to performing the adjustment procedures which are used to establish the neutral, yet bottom-heavy balance which is desired for optimum operation of the transporting system 70. To this end, and referring to FIG. 4, series of pivots 44', 44" are associated with the intermediate bracket 41, in addition to the pivots 44 previously described. For the inverted orientation of FIG. 11, the hardware establishing the connection at the pivot 44 is disassembled, and reassembled to establish the pivot 44". Following this change in configuration, the transport 3 is balanced as previously described, once again establishing a neutral, yet bottom-heavy balance of the transport 3 about the rail 5. This is accomplished while ensuring that the car 15 and is the bridge 45 will satisfactorily pass the hangers 71, irrespective of the modified orientation of the transporting system 70.

Figure 12:
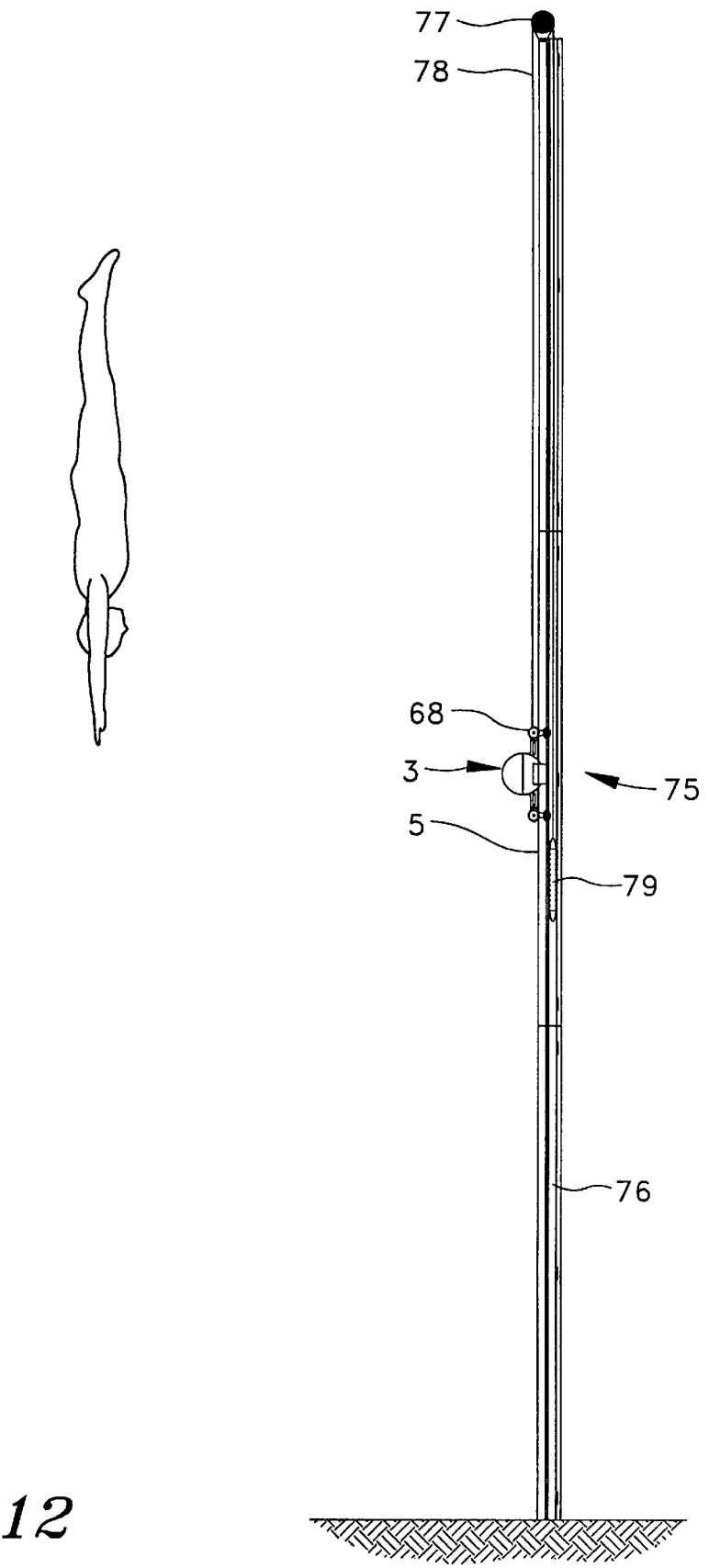
FIG. 12 is a similar elevational view, showing a vertical mounting of the transporting system, for vertical movement along the rail.

FIG. 12 shows deployment of the transporting system in a substantially vertical orientation. Again, the transporting system 75 substantially corresponds to the transporting systems 1, 70 of FIGS. 1 and 11. However, in this configuration, the rail 5 is associated with a mast 76 which serves as its support structure (instead of the supports 6 of the transporting system 1 or the hangers 71 of the transporting system 70). The end of the mast 76 is provided with a pulley 77 for receiving a cable 78 which extends from the transport 3, over the pulley 77 and into engagement with a counterweight 79 which is located on the opposite side of the mast 76. The cable 78 is advantageously connected to one of the hangers 71 associated with the car 15. The counterweight 79 is preferably selected to compensate for the weight of the transport 3 (which, as previously indicated, is on the order of 14 pounds) so that the transport 3 and the counterweight 79 will establish a neutral balance of the transport 3 along the mast 76. As a result, the drive motors 19 will only have to develop movements of the transport 3 along the rail 5, and will not have to overcome the weight of the transport 3 during such movements. In any event, and for such vertical deployments, placement of the bogey wheels 33 on flats 80 (note, FIG. 4) associated with the rail 5 is preferred to enhance stability of the transport 3 about the roll axis. Otherwise, automated steering of the transport 3 (by rotating the bracket 18 responsive to signals received from a flux-gate-compass type sensor) is preferred.

Again, there are differences in the procedures which are used to adjust the transport 3 to achieve a correct balance. For example, the camera system 56 must be caused to assume a normal, upright position by rotating the camera system 56 to a position midway between the position established for the transporting system 1 of FIG. 1 and the transporting system 70 of FIG. 11 (again, by rotating the extension 52 relative to the side 46 of the bridge 45 which receives the camera system 56). In addition, the intermediate bracket 41 must be connected with the bridge 45 to establish the pivot 44' (FIG. 4). Following this, the transport 3 is balanced as previously described to establish a neutral balance for the vertically suspended transport 3. To be noted is that in this case, each of the three adjustable axes are caused to pass through the longitudinal center 66 of the rail 5. The bottom-heavy adjustment of the transport 3 which is preferred for horizontal movements (upright or inverted) is not appropriately used with vertical operations of the transport 3, such as the deployment shown in FIG. 12 (since an appropriate balance of the transport 3 would not result in such case).

Each of the various adjustments, and each of the various deployments previously described, are easily established and can be rapidly assumed using simple assembly procedures. As a result, the transporting system of the present invention is capable of varied use, rapid deployment and straight-forward packing (removal and disassembly), enhancing the versatility of the system.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for supporting and translating equipment along a single rail, comprising:
   (a) a car having a plurality of wheels for providing a translational means for movement in a predetermined direction along a single rail, wherein the plurality of wheels is adaptably arranged to engage the single rail; and
   (b) a support structure pivotally connected to the car about a pitch axis and adapted to support the equipment to be translated along the single rail, wherein the pitch axis passes approximately through the center of gravity of a partial assembly comprising the support structure and the equipment and excluding the car.

2. The apparatus of claim 1, wherein the center of gravity of a complete assembly comprising the car, the support structure, and the equipment is below the longitudinal axis of the rail.

3. The apparatus of claim 1, wherein at least one of the wheels is driven by a motor to translate the car along the single rail.

4. The apparatus of claim 1, wherein the support structure is also pivotally connected to the car about a yaw axis, wherein the yaw axis passes approximately through the longitudinal axis of the rail and the center of gravity of a complete assembly comprising the car, the support structure, and the equipment.

5. The apparatus of claim 1, wherein the pitch axis is below the longitudinal axis of the rail.

6. The apparatus of claim 5, wherein the pitch axis is below the center of gravity of a complete assembly comprising the car, the support structure, and the equipment.

7. The apparatus of claim 1, further comprising one or more passive biasing actuators adapted to maintain an equilibrium orientation between the support structure and the car.

8. The apparatus of claim 7, wherein the passive biasing actuators comprise at least one of springs, dashpots, leaf springs, and an elastomeric material.

9. The apparatus of claim 1, wherein the equipment comprises a camera and the support structure houses electronic components adapted to support operations of the camera.

10. The apparatus of claim 1, wherein the support structure is adapted to be pivotally connected to the car about the pitch axis at two or more different positions to support two or more different modes of operating the apparatus with respect to the rail.

11. The apparatus of claim 10, wherein the two or more different modes of operation comprise:
    a first horizontal mode in which the rail is supported from below by stands; and
    a second horizontal mode in which the rail is supported from above by hangers, wherein the two corresponding different positions ensure that the center of gravity of a complete assembly comprising the car, the support structure, and the equipment is below the longitudinal axis of the rail for both the first and second horizontal modes of operation.

12. The apparatus of claim 10, wherein the two or more different modes of operation comprise a vertical mode in which the rail is substantially vertical and the longitudinal axis of the rail passes approximately through the center of gravity of a complete assembly comprising the car, the support structure, and the equipment.

13. The apparatus of claim 12, wherein the apparatus is adapted to be configured with a cable and a counter weight to counterbalance the weight of the complete assembly.

14. The apparatus of claim 1, wherein:
    the center of gravity of a complete assembly comprising the car, the support structure, and the equipment is below the longitudinal axis of the rail;
    at least one of the wheels is driven by a motor to translate the car along the rail;
    the support structure is also pivotally connected to the car about a yaw axis, wherein the yaw axis passes approximately through the longitudinal axis of the rail and the center of gravity of a complete assembly comprising the car, the support structure, and the equipment;
    the pitch axis is below the longitudinal axis of the rail;
    the pitch axis is below the center of gravity of a complete assembly comprising the car, the support structure, and the equipment;
    further comprising one or more passive biasing actuators adapted to maintain an equilibrium orientation between the support structure and the car, wherein the passive biasing actuators comprise at least one of springs, dashpots, leaf springs, and an elastomeric material;
    the equipment comprises a camera and the support structure houses electronic components adapted to support operations of the camera;
    the car comprises a plurality of wheels adapted to engage the rail, wherein at least one of the wheels is steerable to control the roll orientation of a complete assembly comprising the car, the support structure, and the equipment as the apparatus translates along the rail, wherein the steerable wheel is either controlled by remote control or automatically controlled by a servo mechanism in the apparatus responsive to an orientation sensor; and
    the support structure is adapted to be pivotally connected to the car about the pitch axis at two or more different positions to support two or more different modes of operating the apparatus with respect to the rail, wherein the two or more different modes of operation comprise:
    a first horizontal mode in which the rail is supported from below by stands;
    a second horizontal mode in which the rail is supported from above by hangers, wherein the two corresponding different positions ensure that the center of gravity of a complete assembly comprising the car, the support structure, and the equipment is below the longitudinal axis of the rail for both the first and second horizontal modes of operation; and
    a vertical mode in which the rail is substantially vertical and the longitudinal axis of the rail passes approximately through the center of gravity of a complete assembly comprising the car, the support structure, and the equipment, wherein the apparatus is adapted to be configured with a cable and a counter weight to counterbalance the weight of the complete assembly.

* * * * *

UNITED STATES PATENT AND TRADEMARK OFFICE
CERTIFICATE OF CORRECTION

PATENT NO. : 5,974,978
DATED : November 2, 1999
INVENTOR(S) : Garrett W. Brown and David Keller It is certified that error appears in the above-identified patent and that said Letters Patent is hereby corrected as shown below:

On the title page, item [76] Inventors: Garrett W. Brown

Signed and Sealed this

Twenty-fourth Day of October, 2000

Attest:

Q. TODD DICKINSON

*Attesting Officer*  *Director of Patents and Trademarks*